United States Patent [19]
Jabarin et al.

[11] 4,454,945
[45] Jun. 19, 1984

[54] MULTIWALL CONTAINER

[75] Inventors: Saleh A. Jabarin, Holland; Wendell J. Kollen, Maumee, both of Ohio

[73] Assignee: Owens-Illinois Inc., Toledo, Ohio

[21] Appl. No.: 416,749

[22] Filed: Sep. 10, 1982

[51] Int. Cl.$^3$ .............................................. B65D 81/24
[52] U.S. Cl. .................................... 206/524.3; 62/372; 206/525; 220/461; 220/464
[58] Field of Search ............................ 206/524.3, 525; 220/461, 464; 62/372, 371

[56] References Cited

U.S. PATENT DOCUMENTS

| | | | |
|---|---|---|---|
| 1,963,743 | 6/1934 | Hoodless | 62/372 |
| 3,236,206 | 2/1966 | Willinger | 62/371 |
| 3,370,773 | 2/1968 | Mayo | 220/461 |
| 4,172,152 | 10/1979 | Carlisle | 220/461 |

*Primary Examiner*—William T. Dixson, Jr.
*Attorney, Agent, or Firm*—Thomas L. Farquer; M. E. Click

[57] ABSTRACT

Disclosed are unpressurized multiwall containers of liquid having outer and inner walls of unfoamed plastic material. The plastic container has at least two unfoamed plastic walls, each of which is separated from the next wall by a layer containing a gas or vapor wherein the gas or vapor contains less than ten volume percent oxygen gas and is not reactive with oxygen under packaging conditions. The layer or layers containing the gas can be entirely gaseous or be a foamed or cellular plastic containing, for instance, as little as thirty volume percent gas. The containers have a special utility where it is desired to minimize the permeation of oxygen from the ambient air into the inside of the container. In a particularly important embodiment of the disclosure, the outer plastic layer is supported by a paperboard or wooden container, and the inner plastic container is within the paperboard or wooden container.

6 Claims, 7 Drawing Figures

MULTIWALL CONTAINER

This invention pertains to multiwall containers having outer and inner walls of unfoamed plastic material. The plastic container has at least two unfoamed plastic walls, each of which is separated from the next wall by a layer containing a gas or vapor wherein the gas or vapor contains less than ten volume percent oxygen gas and is not reactive with oxygen under packaging conditions. The layer or layers containing the gas can be entirely gaseous or be a foamed or cellular plastic containing, for instance, as little as thirty volume percent gas. The containers have a special utility in packaging fluids in bulk where it is desired to minimize the permeation of oxygen from the ambient air into the inside of the container.

It is known to package wines in a flexible plastic container which is inserted into a rigid supporting container such as a paperboard box. When it is desired to minimize the permeation of atmospheric oxygen into the container, such as in the packaging of wines in such containers, an expensive treatment has been necessary in the past in order to make the inner plastic containers sufficiently impermeable to oxygen. Commonly, the containers are vapor coated with a film of metal in order to minimize the permeability of oxygen into the container.

It is the object of the present invention to provide plastic containers of liquid for the storage of oxygen-sensitive materials whereby the permeation of oxygen is minimized without resort to expensive surface treatments of the plastic container wall, and without resort to use of an excessive thickness of the plastic container wall.

These and other objects are accomplished according to the invention by providing a plastic container of liquid wherein the container has at least two unfoamed plastic walls, each of which is separated from the next wall by a layer containing a gas or vapor, wherein said gas or vapor contains less than ten volume percent oxygen gas and is not reactive with oxygen under packaging conditions. The separating layer or layers can be entirely gaseous or the gas can be contained in a plastic foamed or cellular layer which is at least thirty volume percent gas. It is immaterial for the purposes of the invention whether the foamed layer is a continuous or open cell foam, or is a closed cell foam, or is a combination thereof. The contents of the package are nonpressurized, i.e., the packaged liquid is at essentially atmospheric pressure when at 20° C.

According to a particularly advantageous aspect of the invention, the foregoing described structure or structures is modified by supporting both the outer and inner plastic container walls with a paperboard or wooden box, wherein the inner plastic container wall is within the box and the outer plastic container wall of barrier plastic encompasses and is supported by the box. The box offers support and allows use of structurally relatively weak plastic envelopes. Futhermore, the box provides an opportunity to separate the outermost and innermost plastic walls with whatever volume of barrier gas that is desired, greater volumes giving greater time lags.

The theoretical lag time for permeation of a gas through a laminate of two or more plastic or rubber layers can be calculated according to well-known equations.[1] The so-called "time-lag" is a measure of the time it takes for the rate of diffusion across the barrier to reach a steady state. One plots the time of permeation against the cumulative total gas permeated, such as oxygen, in milligrams across 100 square inches of the barrier at one atmosphere. After the rate of permeation has reached a steady state, the line plotted on the graph will be a straight line. When this line is extrapolated to the time line, the difference between zero time and the time where the extrapolated line intersects the zero rate on the ordinate is known as the "time-lag."

[1] Barrie et al., Diffusion and Solution of Gases in Composite Rubber Membranes, Trans. Faraday Soc. 59, 869–78, "1963."

According to the present invention, we have conceived that the general equations for calculating the theoretical time-lag across a multilayered laminate can also apply to calculation of the time-lag across two or more layers separated by a gas different than the gas to be diffused. Thus, we have conceived that the total diffusion of the gas such as oxygen into a container across plastic layers separated by a gas be increased by increasing this time-lag by using something in one of the layers which is far cheaper than a layer of a high barrier plastic, namely, an inert gas such as $CO_2$ or nitrogen or the like. Furthermore, the time-lag can be controlled simply by increasing the thickness or volume of the gas layer. Calculations according to the general formulas in the cited reference bear this out. However, we have further found, surprisingly, that the actual time-lag determined by plotting as described above is much larger than calculations predict.

Figure 4:
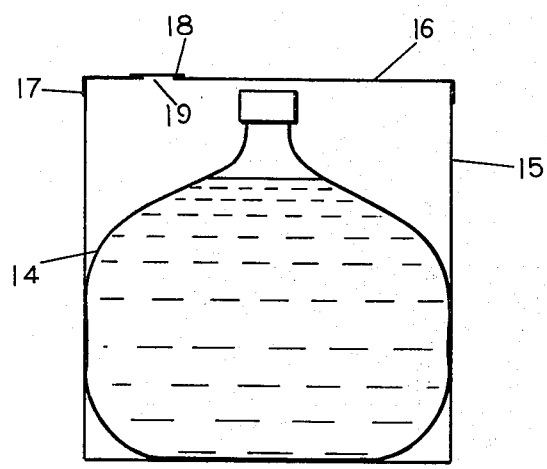
FIG. 4 is a side view comprising a rigid or a flexible inner plastic container containing liquid inside an outer container of barrier plastic which can be in the shape of a box or of a cylinder. The space between the outer and inner plastic walls contains the inert gas having a lower content of oxygen than air, i.e., not over 10 volume percent oxygen gas.
Figure 5:
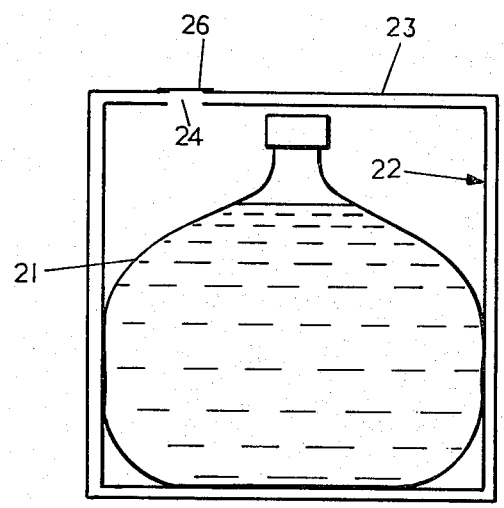
Figure 6:
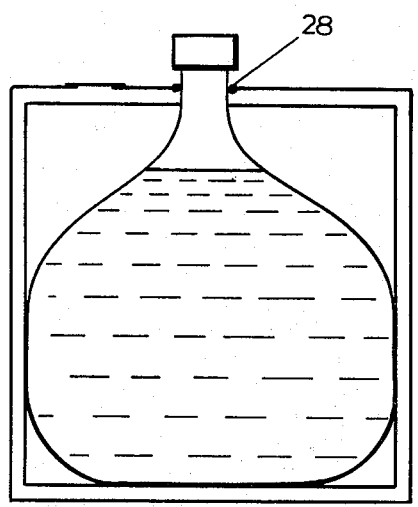

FIGS. 5 and 6 are each side views of a composite container comprising a rigid or flexible inner plastic container containing liquid inside a rigid box or container of wood or paperboard wherein the box or container is enveloped by a film of barrier plastic. The space between the inner container and the box is filled with the inert gas as in FIG. 4. Of course, the gas usually permeates the paperboard or other box wall.

Figure 7:
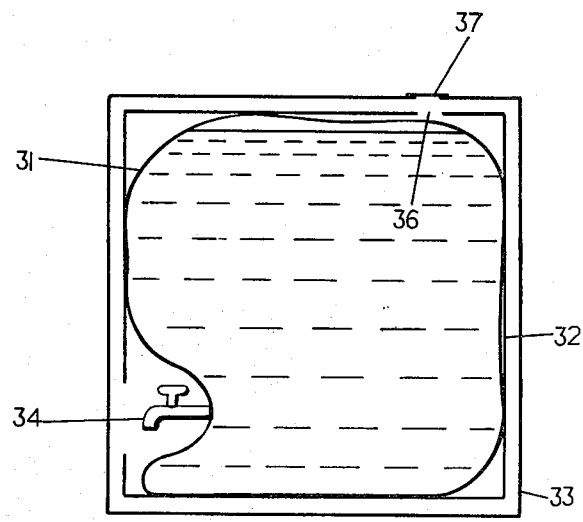

FIG. 7 is a modification of FIGS. 5 and 6 wherein the inner plastic container has a spigot for removing the contents.

Figure 1:
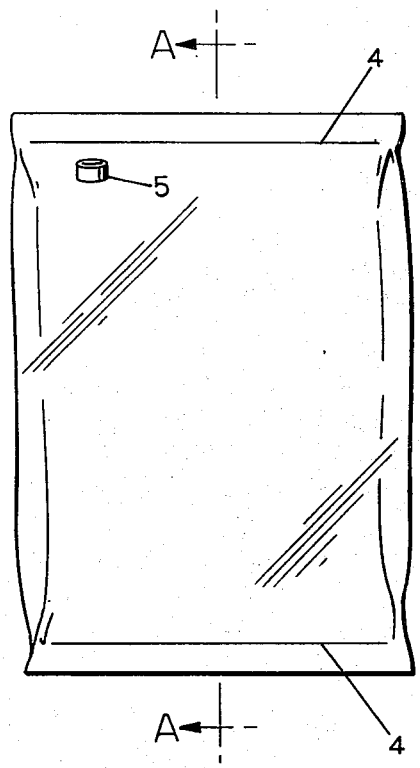
FIG. 1 is a side view of a container containing liquid made from nonrigid films of plastic separated by inert gaseous layer such as nitrogen.
Figure 2:
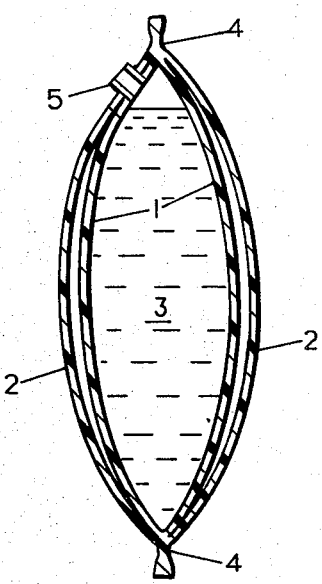
FIG. 2 is a cross sectional view A—A of FIG. 1.

In FIGS. 1 and 2 the container formed by the plastic of walls 1 contains a liquid 3, such as wine, or a semi-liquid such as ketchup, and the space between plastic layers 1 and 2 is filled with nitrogen or other inert gas. Both the inner and outer envelopes 1 and 2 are formed from tubular blown plastic such as poly(ethylene terephthalate). The inner tube is smaller than the outer tube and can be placed within it, and then the upper and lower edges sealed by means of heat along Lines 4. For purposes of illustration a filling spout is shown heat sealed at 5 through which the wine can be introduced and the air displaced by the wine, while at the same time, needle-type valves can be inserted into the bottom wall 2 and another at the top of wall 2 to introduce an inert gas such as nitrogen, and thus flush the air from space between 1 and 2.

Figure 3:
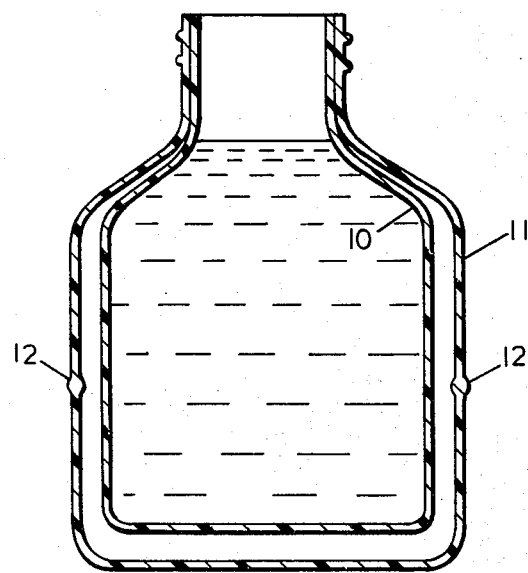
FIG. 3 depicts two rigid bottles one within the other sealed at the neck and separated by a space containing the inert gas having a lower content of oxygen than air, i.e., not being over ten volume percent oxygen gas.

In FIG. 3 an inner bottle of plastic is blow molded in a known manner, and an outer bottle of plastic is blow molded. The size of the necks are such that the neck of the inner bottle fits snugly into the interior of the neck of the outer bottle. To construct the composite container, the outer bottle can have the base cut therefrom along the line 12, the inner bottle inserted with a suitable cement around the neck and the neck is thus glued to the inside of the outer neck. Thereafter, the base portion of the outer bottle is heat sealed to the top portion of the outer bottle. In operation, the same type of needle valves can be used to evacuate the air from the space between walls 10 and 11 by flushing with an inert gas such as nitrogen, and thus create a nitrogen atmosphere in the space. Thereafter, the small holes are sealed off, the inner bottle is filled with wine and then the cap, not shown, applied.

The structure shown in FIG. 5 consists of a rigid or flexible plastic container 21 placed inside a corrugated or paperboard box 22 or even a wooden box. The outer box is then overwrapped with a barrier plastic 23 forming a gas tight outer covering for the box. The wrap can be formed from a tube of shrinkable plastic such as oriented poly(ethylene terephthalate) by pulling it over the box, heat-sealing both ends and then shrinking tightly to the box. Gas for the gas layer is trapped between the inner and outer walls either by forming the outer wrap under a gas flush or by purging through a small hole 24 in the outer wrap and sealing with a barrier tape 26. The barrier tape may be either a heat-seal or pressure sensitive tape with suitable barrier such as a metallized polymer.

FIG. 6 shows a structure similar to that of FIG. 5 except that the opening to the inner container extends through the outer wrap. The outer wrap is sealed to the inner container at 28 where it extends through the box. A heat-seal or adhesive such as a hot melt is suitable to form a gas tight seal.

FIG. 4 shows a structure similar to FIG. 5 except the outer container 15 is a rigid box or a cylindrical container formed from a barrier meterial. The outer box or cylindrical container 15 can be made from a barrier plastic or a multilayer plastic incorporating a barrier layer. The cover 16 can be either a flexible or rigid material with sufficient barrier properties and is attached and sealed to the box at 17 with either a heat seal or an adhesive. Purging of the gas space through hole 19 and sealing at 18 is accomplished as described for the structure shown in FIG. 5. A suitable material for inner container 14, outer container 15 and lid 16 is poly(ethylene terephthalate).

A bag-in-box structure, especially suitable for larger sizes of 4 to 6 liters, is shown in FIG. 7. The inner plastic container 31 is usually a flexible bag but can be a rigid plastic. The outer container is a corrugated or paperboard or even a wooden box 32 overwrapped with a barrier plastic film 33 such as discussed for FIG. 5. Containers of the larger sizes can have a spigot 34 for removing the contents. In this case, the outer overwrap can be punctured and the spigot pulled through an opening in the outer container when the contents are dispensed. Purging can be accomplished in much the same way as for the structure shown in FIG. 5 through purge hole 36, which can then be covered with barrier tape 37. If desired, a tube can be inserted through the hole to the lowermost reaches in order to flush with nitrogen or other gas.

The spigot in FIG. 7 can be of the type shown at the top of page 35 of the June 1982 issue of Package Engineering or any one of the dispenser closures described in U.S. Pat. No. 3,400,866 issued Sept. 10, 1968 to Lazzaro A. Fattori.

In all of the embodiments of the invention, the operative gas layer such as nitrogen can be entirely gaseous or can be contained in a foam, open or closed cell, and the space or volume between the two unfoamed plastic container walls is at least thirty volume percent gas.

In an example illustrating the improvement of time-lag when two plastic layers are separated by a nitrogen layer, as compared with the same thickness of plastic not separated by any gas layer, we have tested both systems with an Oxtran 100 permeation tester which is sold by Modern Controls of Minneapolis, Minn. It is based on a coulometric detection principle.

In the control experiment two touching films of 3 mils thick poly(ethylene terephthalate) is enclosed between a closed chamber on top and a separate closed chamber on the bottom. To begin with, the closed chamber on top was continually flushed with an atmosphere of nitrogen and the bottom chamber was initially flushed with an atmosphere of nitrogen. The flushing with the nitrogen in the bottom chamber was continued at a slow rate and the effluent tested in the detector instrument of the Oxtran, until no oxygen could be detected. Thereafter, the flow of nitrogen through the bottom chamber was continued and the top chamber was thoroughly flushed with pure oxygen and thereafter a flow of oxygen was maintained to the top chamber under the influence of a pressure control which held the pressure at one atmosphere. Using this setup, the permeation of oxygen through the membrane was continued and the cumulative amount of oxygen determined at timed intervals until a steady state had been reached. Thereafter, the data was plotted and the time-lag determined.

The foregoing procedure was repeated except that a "laminate" of two 3 mils thick films of poly(ethylene terephthalate) were separated by an empty space of 3 mils. The edges of the so-called "laminate" were sealed in order to make a closed volume between the two films. The procedure was carried out as before and, of course, when no oxygen was detected from the bottom chamber, there was also no oxygen in the space between the two plastic films. At this point the top chamber was quickly flushed with oxygen and then the oxygen pressure maintained at one atmosphere as before. Again, the time-lag was determined.

Thus, it was found that the time-lag was 0.19 days in the control and, for the same amount of plastic, was 3.5 days in the structure of the invention with the layer of nitrogen initially filling the space between the two films.

Calculations would have predicted when using the equations referred to hereinbefore that the time-lag in the case of the composite separated by the nitrogen layer would have been only 2.5 days. Calculations show that the calculated time-lag is greatly influenced by the gas layer thickness; in the example above, the calculated time-lag is 22.6 days when the $N_2$ layer is increased from 3 mils to 30 mils.

When it is noted herein that the plastic walls of the outer and inner containers of the composite container or that the adjacent plastic walls of the container are separated or spaced apart, it is not meant to imply that such walls do not touch at some point or points. It will be understood that a large gap such as in parts of FIG. 4 coupled with almost no gap at other parts (touching portions of the walls) still averages out to a gas "layer" volume that will increase the time lag according to the present invention.

As used herein, "paperboard" containers include corrugated and fiber containers.

As will be evident to those skilled in the art, various modifications of this invention can be made or followed in the light of the foregoing disclosure and discussion without departing from the spirit and scope of the disclosure or from the scope of the claims.

We claim:

1. A sealed composite plastic container of liquid which is at essentially atmospheric pressure when at 20° C., said container having inner and outer spaced apart unfoamed plastic walls, each said wall consisting essentially of barrier material, the inner plastic container wall being within a wooden or paperboard container or box and the outer plastic container wall encompassing the wooden or paperboard container or box which supports said outer plastic container wall, the space between said plastic walls containing a gas or vapor, wherein said gas or vapor at the time of initial packaging of the liquid in the container contains less than ten volume percent elemental oxygen and wherein said gas or vapor is not reactive with oxygen.

2. A composite plastic container of claim 1 wherein the inner plastic container wall is essentially rigid.

3. A composite plastic container of claim 1 wherein the inner plastic container wall is not rigid.

4. A composite plastic container of any one of claims 1-3 wherein the gas is predominantly nitrogen.

5. A composite plastic container of any one of claims 1-3 wherein the gas is predominantly carbon dioxide.

6. A composite plastic container of any one of claims 1-5 wherein the said gas is at least partially contained in a plastic foam and the said gas is at least 30 volume percent of the space between said outer and inner unfoamed plastic walls.

* * * * *